United States Patent [19]

Fowler

[11] 4,365,829
[45] Dec. 28, 1982

[54] SEWER TAPPING APPARATUS

[76] Inventor: Dwight W. Fowler, 3865 SE. River Rd., Hillsboro, Oreg. 97123

[21] Appl. No.: 72,202

[22] Filed: Sep. 4, 1979

[51] Int. Cl.$^3$ .............................................. F16L 3/04
[52] U.S. Cl. .................................. 285/162; 285/236; 285/237
[58] Field of Search ............... 285/158, 162, 189, 192, 285/196, 338, 236, 237, 230, 423, 222; 16/2

[56] References Cited

U.S. PATENT DOCUMENTS

| 3,406,988 | 10/1968 | Jones | 285/237 X |
| 3,663,042 | 5/1972 | Fowler | 285/194 |
| 3,879,069 | 4/1975 | Oostenbrink | 285/162 |
| 3,953,555 | 4/1976 | Gley | 285/162 X |
| 3,958,313 | 5/1976 | Rossborough | 285/230 |
| 4,009,545 | 3/1977 | Rossborough | 52/173 R |
| 4,019,760 | 4/1977 | Streit | 285/423 |
| 4,155,572 | 5/1979 | Bretone | 285/236 X |

FOREIGN PATENT DOCUMENTS 1442624 7/1966 United Kingdom ................ 285/162

OTHER PUBLICATIONS

Dukor Company brochure: 2 pp.

Primary Examiner—Dave W. Arola
Attorney, Agent, or Firm—Klarquist, Sparkman, Campbell, Leigh, Whinston & Dellett

[57] ABSTRACT

A tap is established in a sewer main by drilling an aperture in the sewer main and locating a rubber cylinder into said aperture wherein the end of said rubber cylinder is provided with toroidal protuberances immediately adjacent the exterior wall and interior wall of the sewer main. The rubber cylinder is thicker in the region between the protuberances, and an interior branch pipe is driven into the rubber cylinder for forcing the cylinder outwardly against the interior edge of the aperture in the sewer main while substantially locking the aforementioned protuberances in position. A branch pipe extension is connected either to the rubber cylinder or to the interior branch pipe.

9 Claims, 6 Drawing Figures

U.S. Patent  Dec. 28, 1982  4,365,829
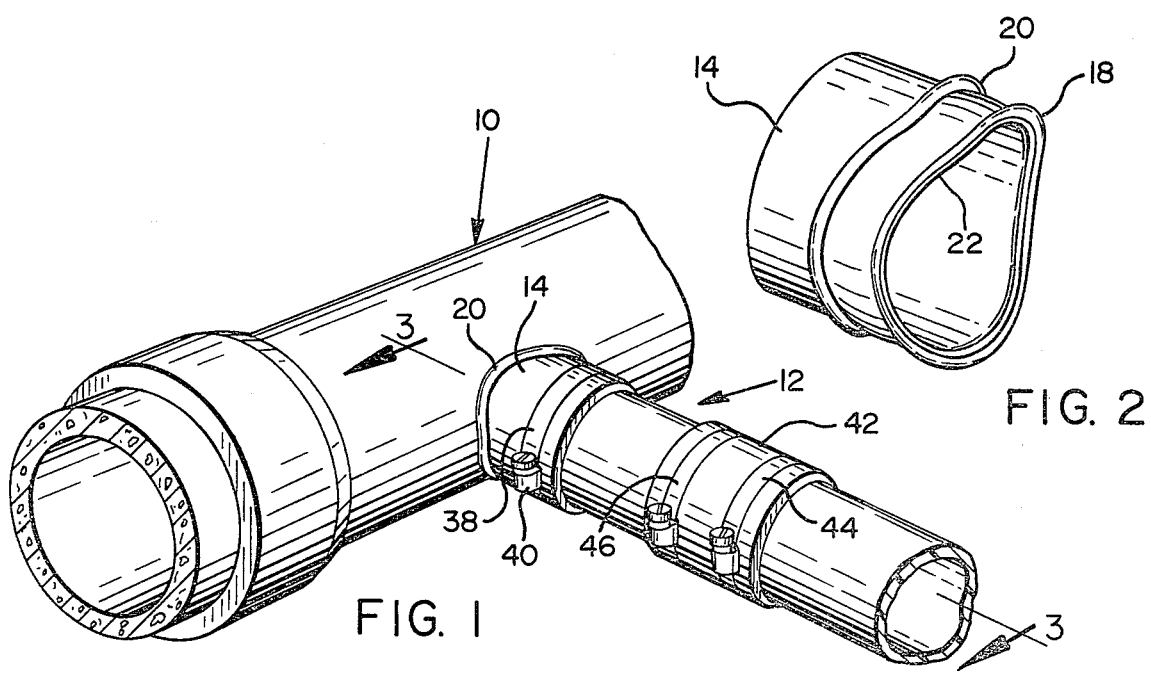
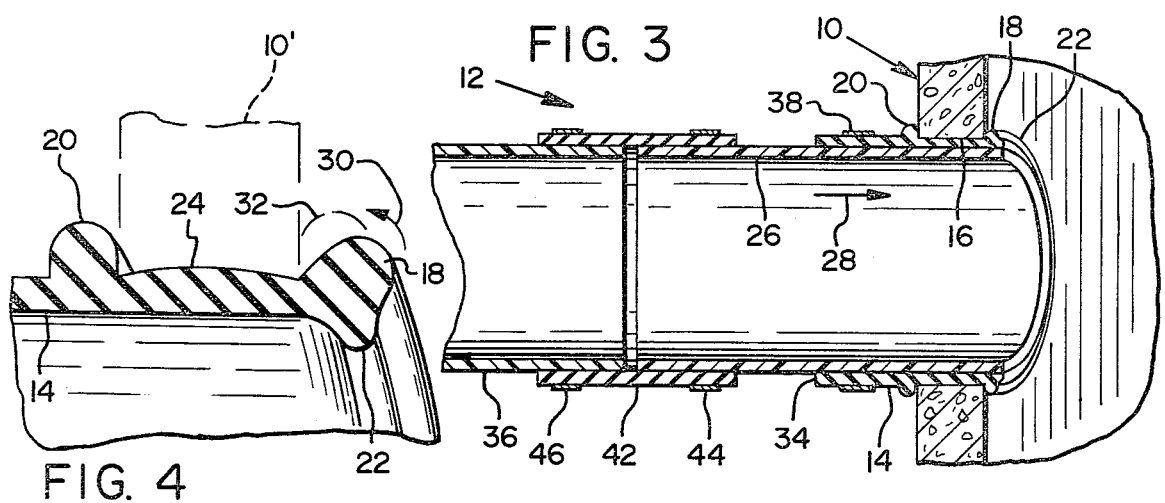
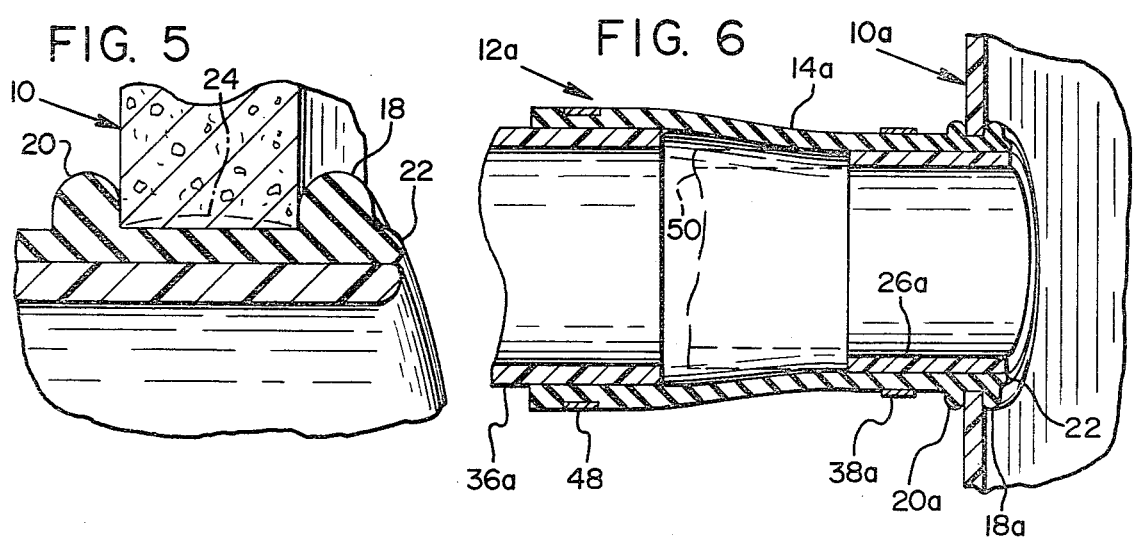

SEWER TAPPING APPARATUS

BACKGROUND OF THE INVENTION

The present invention relates to a method and apparatus for providing sewer taps and particularly to such a method and apparatus for providing a substantially filtration proof tap in an economical manner.

Prior art sewer taps have generally employed poured concrete for sealing a branch pipe to a sewer main. This construction is subject to breakage when the connection is covered up with earth, with resultant undesired filtration. Various mechanical constructions are available which could be used to avoid a poured concrete joint. For example, a saddle designed to fit around a main pipe can hold branch pipe and provide a seal therebetween. Complex constructions including saddles are not usually suitable for making sewer pipe connections because of the problem of making a really accurate connection underground, e.g. in an excavation after uncovering an existing sewer main. Moreover, rigid support usually provided by a saddle connection may also result in possible breakage and undesired filtration.

An improved sewer tap is described and claimed in my prior U.S. Pat. No. 3,663,042 and has the advantage of ease of connection and flexibility to avoid breakage and undesired filtration. It is desired according to the present invention to provide an improved sewer tap having the advantages of ease of connection and flexibility to avoid breakage while also providing a simpler and more economical construction.

SUMMARY OF THE INVENTION

According to the method and apparatus of the present invention, a round aperture is drilled in the side of a main sewer line and a cylinder of elastomeric material having an exterior diameter approximating the diameter of the said aperture is extended into said aperture. This cylinder is provided with exterior toroidal protuberances immediately adjacent the exterior of the main sewer line and immediately adjacent the interior of the main sewer line, and preferably the cylinder has a greater wall thickness between said protuberances. After inserting the cylinder into the main sewer line, an interior branch pipe is driven into the cylinder, said interior branch pipe having a radius slightly larger than the interior radius of said aperture in said main sewer line minus the thickness of the elastomeric cylinder in the region between said protuberances. As the interior branch pipe is driven into the cylinder, a seal is formed between the interior edge of the aperture in the main sewer line, the elastomeric cylinder, and the interior branch pipe. At the same time, the protuberances immediately inside and outside the main sewer line are firmly held in position. Preferably, the forwardmost protuberance, for positioning inside the main sewer line, together with the forward lip of the elastomeric cylinder are depressed inwardly toward the axis of said cylinder in the non-stressed condition thereof. Then, as the interior branch pipe is driven within the cylinder, the forward protuberance positioned within the main sewer line heels over in tightly secured engagement with the main sewer line.

It is accordingly an object of the present invention to provide an improved sewer tapping method which is easily carried out and an improved sewer tapping apparatus which is economical in construction.

It is another object of the present invention to provide an improved sewer tapping method and apparatus which avoids the filtration encountered with poured concrete seals.

It is a further object of the present invention to provide an improved sewer tapping method and apparatus which permits a somewhat flexible joint in order to avoid cracking of the joint due to the weight of earth supported thereby.

It is another object of the present invention to provide an improved sewer tapping method and apparatus which conveniently locks a branch line to a main sewer line.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view of a sewer tap according to the present invention;

FIG. 2 is a perspective view of a first end of an elastomeric cylinder according to the sewer tap of the present invention;

FIG. 3 is a longitudinal cross section taken through the branch line at 3—3 in FIG. 1;

FIG. 4 is a longitudinal cross section of a first end of the aforementioned elastomeric cylinder in its non-stressed condition;

FIG. 5 is a longitudinal cross section of the same first end of said elastomeric cylinder in place within an aperture in the main sewer line; and FIG. 6 is a longitudinal cross section of a branch line according to an alternative embodiment of the present invention.

DETAILED DESCRIPTION

Referring to the drawings and particularly to FIGS. 1 through 5 illustrating a sewer tap according to the first embodiment of the present invention, a concrete or transite cylindrical pipe 10 comprises a portion of a main sewer line or sewer main which, it is understood, will ordinarily be buried below the surface of the ground. Branch line 12 is tapped into line 10 and extends outwardly from line 10 usually in perpendicular relation to the center line of main sewer line 10. Branch line 12 is of composite construction including a boot or cylinder 14 formed of a resiliently compressible or elastomeric material, e.g. a synthetic rubber such as neoprene. Cylinder 14 is smaller in outside diameter than the main sewer line and is circular for extending into round hole or aperture 16, drilled in the side of the main sewer line, with which it has a relatively snug fit. The first end of the cylinder 14 which extends into the main sewer line is provided with a pair of spaced protuberances 18 and 20 extending circumferentially around the cylinder and each comprising an annulus joined to the exterior of the cylinder. The protuberances 18 and 20 may comprise rubber O-ring seals which are adhesively joined to the exterior of the cylinder, but preferably form an integral part of the cylinder while retaining a toroidal configuration. The cross section of each toroidal protuberance is such as to provide a firm abutment immediately inside and immediately outside the wall of the main sewer line 10, as illustrated in FIG. 3, each protuberance extending radially outwardly from the cylinder 14 by a distance about equal to the wall thickness of the cylinder.

The protuberances 18 and 20 are spaced apart along cylinder 14 by a distance equal to the thickness of the sewer main wall so as to provide a tight sealing relationship therewith. Since the intersection between the branch line 12 and the main sewer line 10 is non-circular, each of the protuberances is also non-circular, each having a shape approximately defined by the figure of intersection between the cylinder and the main sewer line. Thus, each has a somewhat dished appearance so it will make good contact with the exterior and interior of the main sewer line. As will be appreciated, slightly differently shaped configurations will result depending upon the relative diameters of the main sewer line and the branch line, and if the main sewer line is very large in diameter compared to the branch line, the toroidal protuberances will be nearly circular.

The initial cross-section configuration at the forward end of the elastomeric cylinder is illustrated in FIG. 4. In the relaxed condition, the protuberance 18 is disposed slightly inwardly toward the axis of the cylinder. That is, the non-stressed diameter of toroidal protuberance 18 is slightly less than the diameter of toroidal protuberance 20. Also, the forward lip 22 at the forward or the first end of the cylinder is depressed or bent inwardly in the relaxed condition, with the protuberance 18 canting slightly forwardly thereon. This configuration aids in the insertion of the forward end of the cylinder, including protuberance 18, into the aperture 16 drilled in the main sewer line. The lip 22 is only slightly forward of the protuberance 18 in the final configuration of the branch line, with the lip 22 also having a shape approximately defined by the figure of intersection between the cylinder and the main sewer line. Thus, the lip 22 extends a very short distance into the main sewer line whereby to avoid interference with the passage of material in the sewer line and has a constant spacing from the inside wall of the main sewer line as illustrated in FIG. 5.

The wall thickness of the cylinder 14 in region 24 between protuberances 18 and 20, is preferably greater than the wall thickness elsewhere along the cylinder, except for protuberances 18 and 20 themselves. This is the area which engages the interior edge of the aperture 16, the position of the main sewer line being illustrated in dashed lines at 10' in FIG. 4. The additional thickness enhances the sealing properties of the joint as hereinafter further described.

After insertion of the forward end of cylinder 14 in mating relation with aperture 16 so that the protuberances 18 and 20 fit the curvature of the side of the main sewer line, a branch pipe 26, suitably formed of plastic such as PVC, is driven into the outer end of the cylinder 14 in the direction indicated by arrow 28 in FIG. 3. The outer radius of the branch pipe 26 is slightly larger than the interior radius of the aperture 16 minus the thickness of the elastomeric cylinder in the area 24 between the protuberances. Thus, driving the branch pipe 26 into the cylinder squeezes the rubber cylinder against the inside edge of the aperture 16 forming a tight seal and also resiliently supporting the branch pipe. If the area 24 is slightly thickened as illustrated in FIG. 4, the added compression in this area improves the seal. Not only does the branch pipe 26 squeeze the elastomeric material against the inside edge of the aperture 16, while forming a firm seal between protuberance 20 and the outer wall of the main sewer line, but also the branch pipe forces the toroidal protuberance 18 up in the direction indicated by arrow 30 in FIG. 4 to the dashed line position indicated at 32. The protuberance 18 and lip 22 are caused to heel over against the interior of the main sewer line 10. The protuberance 18 is forced into firm sealing contact with the inside edge of the main sewer line and locks the structure in place. The internal protuberance 18 prevents removal of the branch line, and protuberance 20 acts as a keeper to prevent the rubber cylinder from protuding too far into the main sewer line. It will be observed the forward edge of the interior branch pipe 26 also has a shape approximately defined by the figure of intersection between the cylinder 14 and the main sewer line 10, and the same is aligned with the edge of lip 22. Naturally, the interior branch pipe 26 must be aligned correctly with the main sewer line before being driven into place, and a mark is suitably provided on the exterior side of the branch pipe 26 so that it will not be inadvertently driven in too far. Such mark on the exterior of the branch pipe 26 is suitably a line or band which is positioned for alignment with the outer edge 34 of the elastomeric cylinder 14.

After the branch pipe 26 is correctly positioned and driven into place, a stainless steel band 38 is positioned on the outside circumference of cylinder 14 toward the second or outer end thereof and this band is drawn up securely with tightener 40 whereby to prevent movement of the branch pipe 26 relative to the cylinder 14. Thus, the branch pipe is prevented from being pulled out of the aperture as earth settles or the branch line moves. Therefore, the configuration is securely locked in place with the branch pipe continuing to force the elastomeric cylinder against the inside of the aperture, and continuing to reinforce the protuberances 18 and 20 in locking relation to the main sewer line wall.

According to the present embodiment, the interior branch pipe 26 also extends outwardly from a second end of said elastomeric cylinder 14 and is joined to a branch pipe extension 36. A second cylinder 42 formed of elastomeric material is secured over the ends of the branch pipe 26 and the branch pipe extension 36 by means of tightened stainless steel bands 44 and 46.

In accordance with a second embodiment as illustrated in FIG. 6, the branch pipe 26a is somewhat shorter and the elastomeric cylinder 14a is made somewhat longer and bell-shaped whereby the cylinder extends further outwardly from the main sewer line than does the interior branch pipe. The outer end of the cylinder 14a receives within the larger bell end thereof a first end of an exterior branch pipe 36a to which the cylinder is joined by a tightened steel band 48.

In the embodiment of FIG. 6, the wall of the main sewer line 10a is illustrated as being thinner and formed from a plastic material. In such case, the protuberances 18a and 20a are positioned more closely for accommodating the smaller main sewer line wall thickness.

In the embodiment of FIG. 6, since the branch line 26a is shorter than the elastomeric cylinder 14a, a separate abutment or plug 50 is employed to drive the branch pipe 26a into place. The plug, although shown broken away, will naturally extend beyond the outer end of cylinder 14a when in use and will suitably carry an aligning mark so that the branch pipe 26a won't be driven in too far. Also, the plug 50 and the branch pipe 26a are suitably keyed to one another to maintain the correct orientation of the branch pipe 26a. After the branch pipe 26a is driven into place, the plug 50 is removed, and a stainless steel band 38a is tightened around the cylinder and the branch pipe for securing the construction in place. Then, the branch pipe extension 36a is secured within the outer end of the cylinder 14a as hereinbefore indicated.

While I have shown and described plural embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A sewer tap for making connection to a main sewer line in the form of a substantially cylindrical pipe, said tap comprising:

a cylinder having a first and a second end, said cylinder being formed of elastomeric material and being smaller in diameter than said main sewer line, said main sewer line having an aperture in the side thereof for receiving said first end of said elastomeric cylinder with said elastomeric cylinder extending outwardly away from the side of said main sewer line, an interior branch pipe within said elastomeric cylinder having an exterior radius slightly larger than the interior radius of said aperture in said main sewer line minus the unstressed thickness of said elastomeric cylinder where the latter is received in said aperture in said main sewer line, said interior branch pipe extending into said aperture in said main sewer line for compressing said elastomeric cylinder against the inside edge of said aperture to form a seal and being held in compression within said elastomeric cylinder, said branch pipe where it extends within said elastomeric cylinder having a substantially uniform outside diameter therealong to define the outside surface of a right circular cylinder, said elastomeric cylinder where it is received in said aperture and where it receives said branch pipe outwardly from the side of said sewer main having a substantially uniform inside diameter therealong to define the inside surface of a right circular cylinder for longitudinally receiving said branch pipe in sliding relation therewithin, adapting said branch pipe to be driven into said elastomeric cylinder to achieve predetermined sealing relation, said branch pipe also extending outwardly from said second end of said cylinder, and further including a branch pipe extension joined to said branch pipe outwardly of said cylinder.

2. The sewer tap according to claim 1 wherein the first end of said elastomeric cylinder is provided with a first toroidal protuberance immediately adjacent the exterior of said main sewer line and a second toroidal protuberance immediately adjacent the interior of said main sewer line for insuring maintenance of the position of said elastomeric cylinder with respect to said main sewer line.

3. The sewer tap according to claim 1 wherein said elastomeric cylinder has a greater wall thickness in its non-stressed condition proximate said first end adjacent the interior of the aperture in said main sewer line than does the cylinder substantially outward of said main sewer line in order to increase the compression of elastomeric material between said interior branch pipe and the interior edge of said aperture in said main sewer line.

4. A sewer tap for making connection to a main sewer line in the form of a substantially cylindrical pipe, said tap comprising:

a cylinder having a first and a second end, said cylinder being formed of elastomeric material and being smaller in diameter than said main sewer line, said main sewer line having an aperture in the side thereof for receiving said first end of said elastomeric cylinder with said cylinder extending outwardly away from the side of said main sewer line, said cylinder having a first exterior protuberance in the form of a first non-circular torus located immediately adjacent the exterior of said main sewer line, having a shape approximately defined by the figure of intersection between said cylinder and said main sewer line, said cylinder having a second exterior protuberance spaced along said cylinder from said first protuberance by approximately the thickness of said main sewer line, said second protuberance being in the form of a second non-circular torus immediately adjacent the interior of said main sewer line, also having a shape approximately defined by the figure of intersection between said cylinder of said main sewer line, said cylinder being open at its said first end defining a lip therearound, said lip at said first end of said cylinder as well as said second protuberance being depressed inwardly toward the axis of said cylinder in the non-stressed condition thereof, and an interior branch pipe within said cylinder for forcing said cylinder between said protuberances outwardly into firm engagement with the interior edge of said aperture in said main sewer line while causing said lip and said second protuberance to heel over outwardly to provide an interior abutment on said cylinder adjacent the interior of said main sewer line to prevent removal of said cylinder from said main sewer line, said branch pipe being held in compression within said elastomeric cylinder, said branch pipe where it extends within said elastomeric cylinder having a substantially uniform outside diameter therealong to define the outside surface of a right circular cylinder, said elastomeric cylinder where it is received in said aperture and where it receives said branch pipe outwardly from the side of said sewer main having a substantially uniform inside diameter therealong to define the inside surface of a right circular cylinder for longitudinally receiving said branch pipe in sliding relation therewithin, adapting said branch pipe to be driven into said elastomeric cylinder to achieve predetermined sealing relation, said branch pipe extending outwardly from said second end of said cylinder, and further including a branch pipe extension joined to said branch pipe outwardly of said cylinder.

5. The sewer tap according to claim 4 wherein said cylinder formed of elastomeric material has a greater wall thickness proximate said first end between said protuberances adjacent the interior of the aperture in said main sewer line than elsewhere along said cylinder to enhance the seal formed as said interior branch pipe encounters said greater thickness and forces the same outwardly into firm engagement with the interior edge of said aperture in said main sewer line.

6. The sewer tap according to claim 4 wherein said lip is also of the shape approximately defined by the figure of intersection between said cylinder and said main sewer line and is immediately adjacent said second protuberance.

7. The sewer tap according to claim 4 including means for securing said interior branch pipe within said cylinder.

8. The sewer tap according to claim 7 wherein said means for securing comprises a steel band extending around said cylinder and compressing the same toward said interior branch pipe.

9. The sewer tap according to claim 4 wherein the forward end of said interior branch pipe extends into said aperture in said main sewer line and has a forward edge immediately adjacent said second protuberance also having a shape approximately defined by the figure of intersection between said cylinder and said main sewer line.

* * * * *